UNITED STATES PATENT OFFICE.

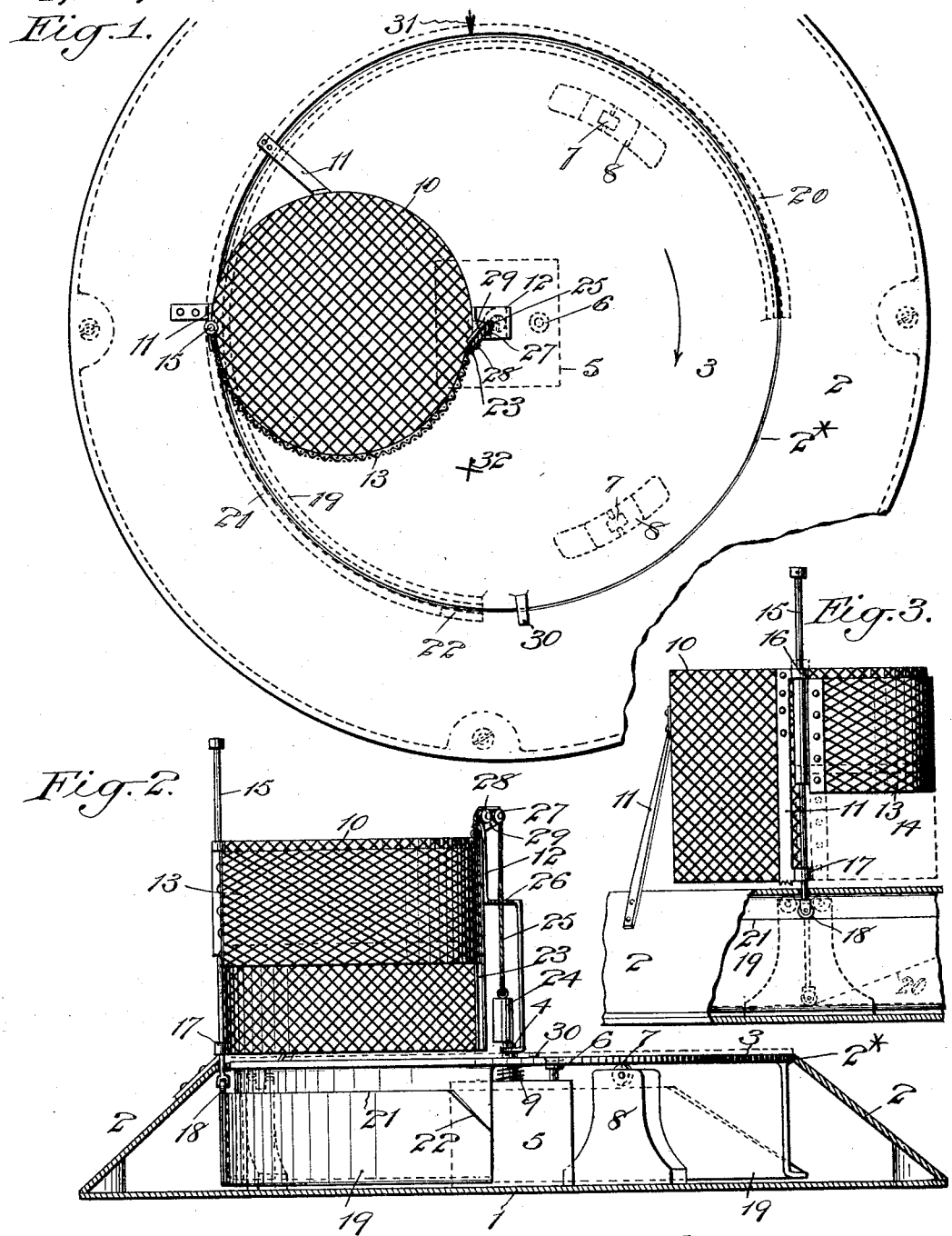

STEPHEN KELTONIK, OF CONEMAUGH, PENNSYLVANIA.

ANIMAL-TRAP.

1,115,681.  Specification of Letters Patent.  Patented Nov. 3, 1914.

Application filed December 30, 1913. Serial No. 809,564.

*To all whom it may concern:*

Be it known that I, STEPHEN KELTONIK, a citizen of the United States, and resident of Conemaugh, in the county of Cambria and State of Pennsylvania, have invented a new and useful Improvement in Animal-Traps, of which the following is a specification.

My invention relates to an improvement in a device for catching or trapping animals alive, and has for its object to provide means for carrying the animal enticed upon a platform which will move slowly in a rotary path toward a cage or trap; means for opening the cage at a predetermined period after the animal has mounted the platform; means for closing the cage after the animal has been carried within it; and means for stopping the rotation of the platform after the cage is closed.

A practical embodiment of my invention is represented in the accompanying drawings, in which—

Figure 1 represents a plan view of my device, Fig. 2 represents a side elevation of the same, the approach of the device being shown in section to show the parts more clearly within, and Fig. 3 represents a detail end elevation of the cage, the approach being broken away to show some of the operating mechanism of the device.

The base of the device is denoted by 1, upon which is secured an inclined approach 2 leading up to a platform 3 which is capable of a slight vertical movement in a hole 2* in the approach 2. The platform is mounted on a shaft 4 of a rotary motor 5, fixed on the base 1. The motor may be spring operated or electrically driven.

A starting pin 6 is mounted on the motor 5 in position to be engaged by the platform in its downward movement. The downward movement of the platform forces the pin down, thereby starting the motor, rotating its shaft and platform. The upward movement of the platform allows the pin to rise thereby stopping the motor, its shaft and platform. When weight is applied to the platform, it is pressed down, as shown in Fig. 2, and it will ride upon antifriction bearers 7 mounted in standards 8 fixed on the base 1 at points equidistant. These bearers afford a firm support and allow an easy rotary motion of the platform. When weight is removed from the platform, it will be lifted by means of a spring 9 to the position shown in dotted lines in Fig. 2.

A cage 10 is suspended over the platform 3 by means of supports 11 uprising from the approach, and a support 12 which bears upon the top of the shaft 4. The cage 10 is, in the present instance, shown cylindrical but it may be made in any form desired.

A gate 13 is adapted to be raised or lowered vertically in front of the entrance 14 to the cage by the following means: A vertical sliding rod 15, to which the gate 13 is attached, is fitted to slide in bearings 16, 17, extending from one of the supports 11, and is provided at its lower end with a roller 18, which is arranged to ride upon a cam 19 depending from the platform. The cam 19 has at one end a gradual incline 20 up which the roller 18 rides to raise the gate 13; a straight or horizontal portion 21 which holds the gate open; terminating in a short and quick incline 22, which causes the roller to act quickly and drop the gate. The free end of the gate slides vertically in a groove 23 fixed on the cage, and is counter-poised by a weight 24, secured to the gate by a flexible connection 25 passing through a hole 26 in the off-set portion of the support 12 and over pulleys 27, 28, mounted on a bracket 29 fixed to the support 12.

A projection 30 is fixed to rotate with the platform 3, which projection will come into contact with the vertical sliding rod 15 and stop its further progress after the cage is closed.

To set the trap, the platform must be rotated in the reverse direction of the arrow shown in Fig. 1, until the projection 30 is at the point marked 31. To entice the animal to be caught upon the platform, it must first be baited with some food suitable for the animal, and placed on the platform in about the position marked 32. This will coax the animal up the approach and upon the platform, which, by the weight of the animal, will depress the platform 3 and pin 6, thereby causing the motor and platform to rotate slowly in the direction of the arrow shown in Fig. 1. At the start of the rotation of the platform, the gate 13 of the cage 10 is closed, but during the progress thereof the incline 20 of the cam 19 will be brought to act upon the roller 18 which will gradually lift the gate to its open position, and will be kept open by the horizontal portion 21 until the bait and animal are well into the cage, where at this point the cam will have reached the decline 22 whereupon the roller with the gate will quickly fall thereby trapping the animal within the cage. After this, the platform has but a short distance to travel where it will bring the projection 30 up against the rod 15 and thereby stop the further movement of the platform.

It is evident that slight changes might be resorted to in the construction, form and arrangement of the several parts without departing from the spirit and scope of my invention; hence I do not wish to limit myself strictly to the structure herein shown and described, but

What I claim is:—

1. A device of the character described comprising a base, a rotatable platform thereon, a cage provided with a gate and means under the control of the platform for operating said gate for opening and closing the cage.

2. A device of the character described comprising a base, a rotatable platform thereon, a cage suspended over said platform, a gate for said cage, and means controlled by the platform for operating said gate for opening and closing the cage.

3. A device of the character described comprising a base, a rotatable platform thereon, a cage suspended over said platform, a reciprocating gate for said cage and means controlled by the platform for operating said gate for opening and closing the cage.

4. A device of the character described comprising a base, a rotatable platform thereon, a cage suspended over said platform, a vertically reciprocating gate for said cage and means controlled by the platform for operating said gate for opening and closing the cage.

5. A device of the character described comprising a base, a rotatable platform thereon, a cage suspended over said platform, a vertically reciprocating gate for said cage, and a cam carried by said platform and engaging said gate for opening and closing the cage.

6. A device of the character described comprising a base, a rotatable platform thereon, a cage suspended over said platform, a rod carried by said cage, a gate secured to said rod and a cam carried by said platform and engaging said rod for reciprocating said gate for opening and closing the cage.

7. A device of the character described comprising a base, a motor thereon, a rotatable platform driven by said motor, a cage suspended over said platform, a rod carried by said cage, a gate for the cage secured to said rod, and a cam carried by said platform and engaging said rod for reciprocating said gate for opening and closing the cage.

8. A device of the character described comprising a base, a motor thereon, a rotatable platform driven by said motor, a cage suspended over said platform, a reciprocating rod carried by said cage, a gate for the cage secured to said rod, and a cam carried by said platform and engaging said rod for reciprocating said gate for opening and closing the cage.

9. A device of the character described comprising a base, a motor thereon, a rotatable platform driven by said motor, a cage suspended over said platform, a reciprocating rod carried by said cage, a counterpoised gate for the cage secured to said rod, and a cam carried by said platform and engaging said rod for reciprocating said gate for opening and closing the cage.

10. A device of the character described comprising a base, a motor thereon, a rotatable platform driven by said motor, a cage suspended over said platform, a reciprocating rod carried by said cage, a counterpoised gate for the cage secured to said rod, a cam carried by said platform and engaging said rod for reciprocating said gate for opening and closing the cage, and a projection on said platform for engaging the said rod to stop the rotation of said platform after the cage is closed.

11. A device of the character described comprising a base, a motor, a starting pin therefor, a depressible rotatable platform driven by said motor, said platform, when depressed, being adapted to engage said pin to start the motor.

In testimony, that I claim the foregoing as my invention, I have signed my name in presence of two witnesses, this 23rd day of December, 1913.

STEPHEN KELTONIK.

Witnesses:
C. W. MOSHOLDER,
EDITH TRESSLER.